United States Patent [19]
Niswanger

[11] Patent Number: 5,794,961
[45] Date of Patent: Aug. 18, 1998

[54] ANTI-THEFT DEVICE FOR TRAILER

[75] Inventor: Raymon A. Niswanger, Granbury, Tex.

[73] Assignee: Blaylock Industries, Inc., Fort Worth, Tex.

[21] Appl. No.: 679,964

[22] Filed: Jul. 15, 1996

[51] Int. Cl.$^6$ .................................................. B60D 1/60
[52] U.S. Cl. .................................. 280/507; 70/14; 70/232
[58] Field of Search .............................. 280/507, 511; 70/14, 232, 34, 163, 258, 237

[56] References Cited

U.S. PATENT DOCUMENTS

| | | | |
|---|---|---|---|
| 2,571,349 | 10/1951 | Eckles | 70/14 |
| 3,884,055 | 5/1975 | Vuillemot | 70/58 |
| 4,032,171 | 6/1977 | Allen et al. | 280/507 |
| 4,141,569 | 2/1979 | Dilk | 280/507 |
| 4,459,832 | 7/1984 | Avrea | 70/14 |
| 4,577,884 | 3/1986 | Harris | 280/507 |
| 4,836,570 | 6/1989 | Lopez et al. | 280/507 |
| 5,351,511 | 10/1994 | Bernier | 280/507 |
| 5,410,893 | 5/1995 | Easterwood | 280/507 |
| 5,516,139 | 5/1996 | Woods | 280/507 |

*Primary Examiner*—Anne Marie Boehler
*Attorney, Agent, or Firm*—James E. Bradley

[57] ABSTRACT

An anti-theft device that can be used on different size trailer tongues of the type having a socket for receiving a tow ball of a trailer hitch. The device includes a base and a socket insert that projects from the base and is received within the socket of the trailer tongue. A pair of side members are joined to the base and oriented so that the trailer tongue must be passed between the side members for insertion and removal of the socket insert from the trailer tongue socket. Each side member has first and second holes formed therein. A retaining rod inserts into either of the first and second holes of the side members so that the retaining rod extends between the side members and above the trailer tongue to prevent the passage of the trailer tongue between the side members and thus prevent removal of the socket insert from the trailer tongue socket. The first and second holes are each located at different positions to accommodate trailer tongues of different sizes. A locking device is provided for preventing removal of the retaining rod from either of the first and second holes of the side members.

13 Claims, 3 Drawing Sheets

ANTI-THEFT DEVICE FOR TRAILER

BACKGROUND OF THE INVENTION

1. Field of the Invention

This invention relates to an anti-theft device for a trailer.

2. Description of the Prior Art

Trailers of the type having a socket in the trailer tongue for receiving a tow ball of a trailer hitch come in only a few standard sizes. Without some type of lock or theft-deterrent device, a trailer can be easily coupled to one of these standard size hitches and towed away by someone. Several locks are available to prevent the unauthorized towing of these trailers. One of the problems with these locks, however, is that they will usually only accommodate trailers of certain sizes and not others. What is therefore needed is a device that can be used for different size trailers to prevent the unauthorized towing or theft of the trailer.

SUMMARY OF THE INVENTION

An anti-theft device that attaches to the trailer tongue of a trailer of the type having a socket for receiving a tow ball of a trailer hitch, and which can be used on different size trailer tongues is provided. The device includes a base and a socket insert that projects from the base. The socket insert is received within the socket of the trailer tongue. A pair of side members are joined to the base and oriented so that the trailer tongue must be passed between the side members for insertion and removal of the socket insert from the trailer tongue socket. Each side member has first and second holes formed therein. A retaining rod inserts into either of the first and second holes of the side members so that the retaining rod extends between the side members and above the trailer tongue to prevent the passage of the trailer tongue between the side members and thus prevent removal of the socket insert from the trailer tongue socket. The first and second holes are each located at different positions to accommodate trailer tongues of different sizes. Locking means is provided for preventing removal of the retaining rod from either of the first and second holes of the side members.

DESCRIPTION OF THE PREFERRED EMBODIMENT

Figure 1:
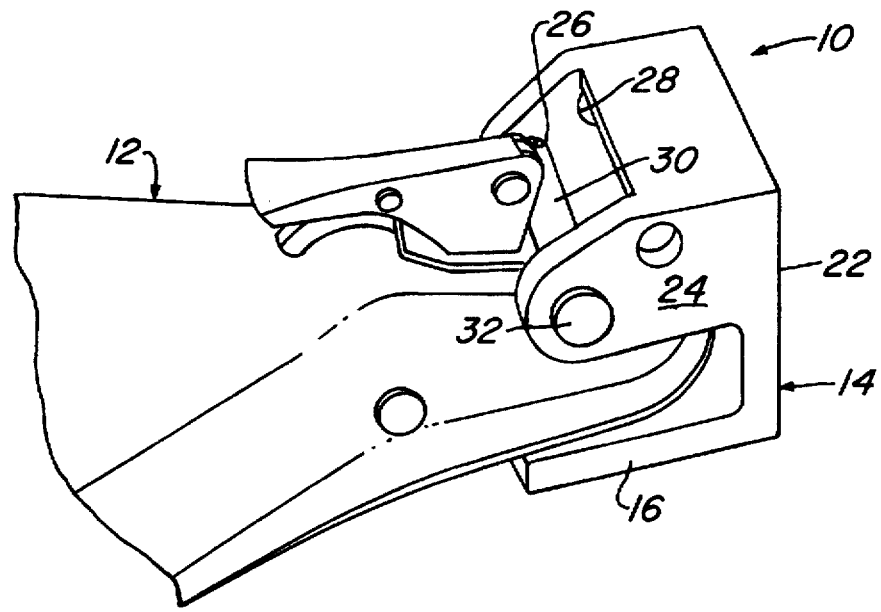
FIG. 1 is a perspective view of a tongue of a trailer with a anti-theft device coupled thereto to prevent theft of the trailer and constructed in accordance with invention.

Referring to the figures, FIG. 1 shows an anti-theft device 10 coupled to a trailer tongue 12 of a trailer, such as those commonly used for towing boats and the like. The device 10 has a base, designated generally at 14, having a flat, bottom plate 16. A socket insert 18 projects upward from the center of the bottom plate 16. The socket insert 18 is joined to the bottom plate 16 by means of a neck 20. The socket insert 18 is configured generally as a conventional ball of a trailer hitch, as would be normally used with the trailer tongue 12.

Extending upward from the rearward end of the bottom plate 16 is a flat back plate 22. The back plate 22 is generally perpendicular to the bottom plate 16 and is spaced apart a distance from the socket insert 18. Extending forward from the back plate 16, along either side of the socket insert 18 are opposite side members 24. The side members 24 are generally flat plates that are oriented perpendicular to the bottom plate 16 and the back plate 16. The forward edge of the side members 24 terminates slightly forward of the socket insert 18. The side members 24 are laterally spaced apart to provide a clearance wide enough to allow passage of the trailer tongue 12 therebetween as will be described further on.

The base 14, including the bottom plate 16 and back plate 22, side members 24, and the socket insert 18 should all be formed as a single, unitary metal member, such as by forging, casting, etc. . . .

Formed in each side member 24 are holes 26, 28 that are positioned directly above the socket member 18 at different heights or distances from the bottom plate 16. The holes 26 are in an aligned arrangement with each other and holes 28 are aligned with each other so that both sets of holes 26 or 28 are able to receive a retaining rod 30. It should be understood that although reference may be made to both pairs of holes 26, 28, the retaining rod 30 may be inserted into only one aligned pair at any given time.

Figure 2:
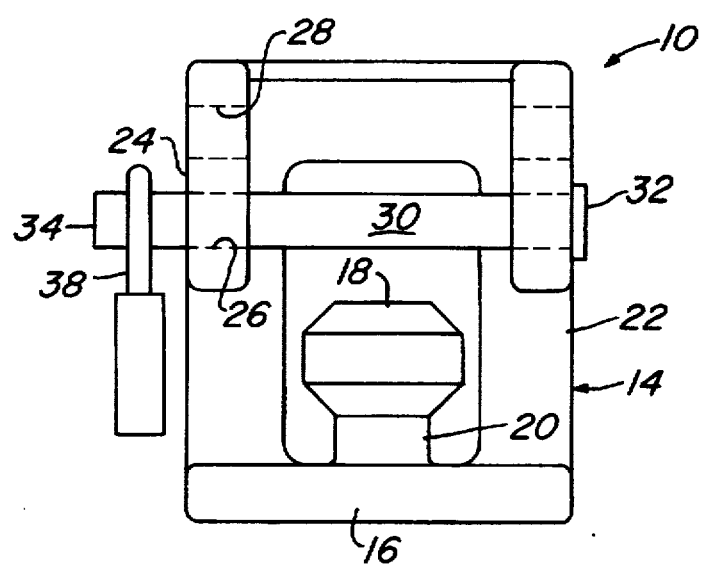
FIG. 2 is a front elevational view of the device of FIG. 1.
Figure 3:
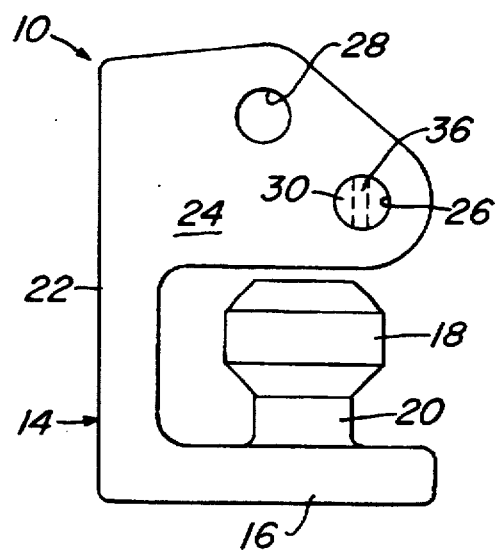
FIG. 3 is a side elevational view of the device of FIG. 2.

The retaining rod 30 is provided with an oversized head 32 at one end that seats against the exterior of one of the side members 24 when the retaining rod is fully inserted into either of the pair of holes 26 or 28 to prevent further passage therethrough, with the midsection of the rod 30 extending between the two side members 24. The retaining rod 30 is of a sufficient length so that when the rod 30 is fully inserted into the holes 26 or 28 of the side members 24, the end 34 of the rod 30 opposite the head 32 projects a distance from the exterior of side member 24, as shown in FIG. 2. A hole 36 is formed in this end 34 for receiving a pad lock 38 or locking device to prevent the removal of the retaining rod 30 from the holes 26 or 28 of the side members 24 when inserted therein.

Figure 4:
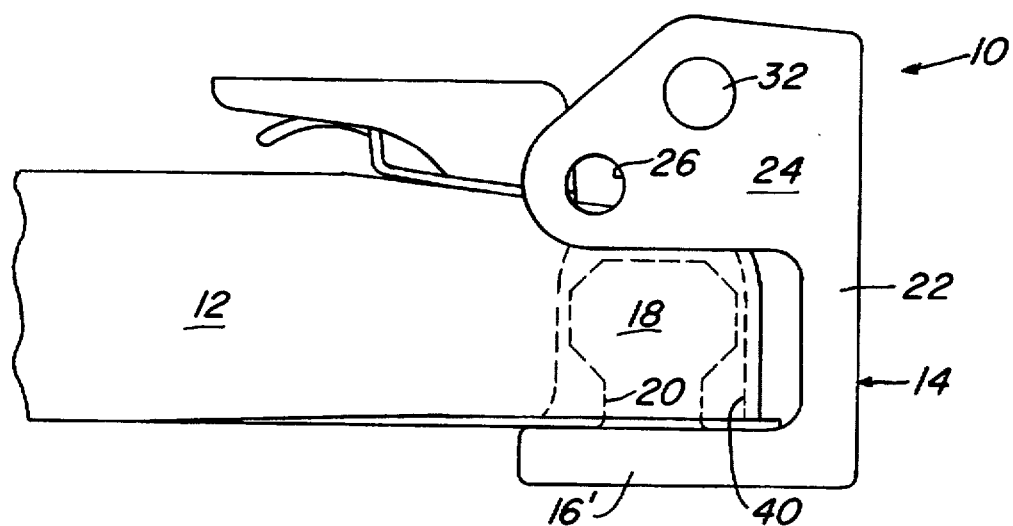
FIG. 4 is a side elevational view of the device coupled to a trailer of a different size.

To use the device 10, the retaining rod 30 is first removed from the holes 26 or 28 of the side members 24. With the rod 30 removed, the device 10 is positioned on the trailer tongue 12 of the trailer to be locked. This is accomplished by passing the forward end of the trailer tongue 12 between the side members 24 so that the socket insert 18 inserts into the socket 40 (FIG. 4) of the trailer tongue 18. It is essential that the side members 24 be oriented so that the trailer tongue 12 must be passed through the clearance between the side members 24 in order to insert the socket insert 18 into the socket 40. The socket insert 18 should be inserted as far as possible into the socket 40 or until the bottom of the trailer tongue 12 rests on the bottom plate 16. With the socket insert 18 so inserted, the rod 30 is then inserted into the holes 26 or 28 so that the head 32 abuts against the exterior of the side member 24. Selection of the holes 26 or 28 will depend upon the size of the socket 40 and trailer tongue 12. For smaller trailer tongues 12, the rod 30 is inserted into the lower holes 26, as shown in FIG. 1, so that the socket insert 18 is maintained within the socket 40 as far as possible. For larger trailer tongues, such as shown in FIG. 4, it may only be possible to insert the rod 30 into the upper holes 28 because of interference with the top portion of the trailer tongue. The upper holes 28 should be positioned above the bottom plate 16 a great enough distance to accommodate these larger sized trailer tongues.

With the socket insert 18 inserted into the socket 40 of the trailer tongue 12, and the rod inserted into the holes 26 or 28, the lock 38 is positioned on the end 34 of the retaining rod 30 by passing the lock 38 through the hole 36 provided for this purpose. The lock 38 may be a combination lock or key lock. This prevents removal of the retaining rod 30 from between the side members 24. The presence of the retaining rod 30 extending between the side members 24 will prevent passage of the trailer tongue 12 between the side members 24 so that the socket insert 18 cannot be removed from the socket 40. The socket insert 18 and bottom plate 22 thus prevents the trailer tongue 12 from being hitched to a tow ball of a towing vehicle and thereby prevents theft of the trailer.

Figure 5:
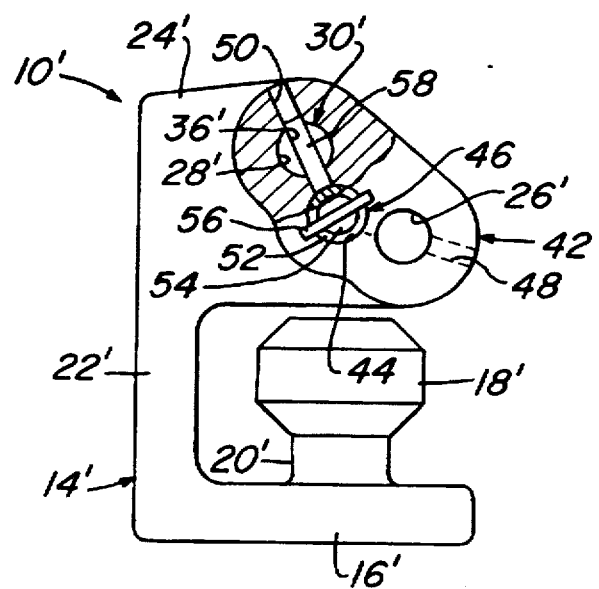
FIG. 5 is a side elevational view of another embodiment of the device utilizing a key assembly.
Figure 6:
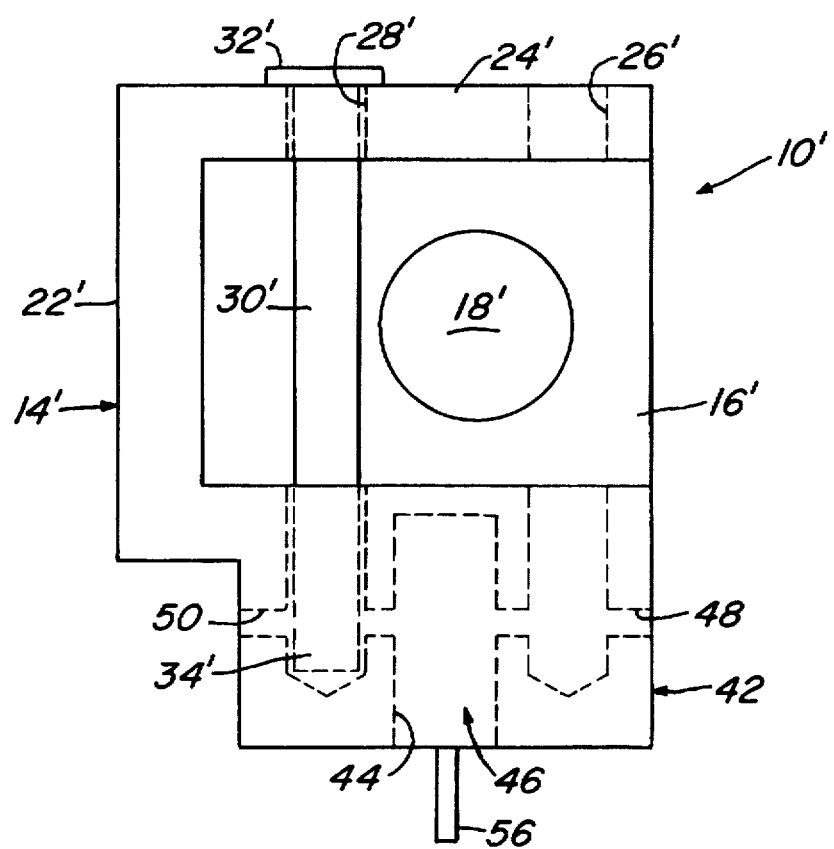
FIG. 6 is a top plan view of the device of FIG. 5.

FIGS. 5 and 6 show another embodiment of the device, with like components being designated with a prime symbol. The device 10' is provided with a metal block 42 that is integrally formed and joined to the exterior of one of the side members 24' with the holes 26', 28' extending through the side member 24' and into block 42 and terminating therein.

Formed in the block 42 is a recess 44 for receiving a key assembly 46. Locking bolt passageways 48, 50 extend from the recess 44 into holes 26', 28', respectively, as shown in FIG. 5. The key assembly 46 is of conventional design having a lock cylinder 52 that houses the tumblers (not shown) and plug 54 for receiving key 56. A locking bolt 58 of the key assembly 46 extends into one of the passageways 48, 50, depending upon the orientation of the key assembly 46. Thus, if it is necessary to insert the retaining rod 30' into the upper holes 28', lock cylinder 52 is inserted into the recess 44 so that the locking bolt 58 will project into passage 50 and into hole 28'. Likewise, if it is necessary that retaining rod 30' be inserted into the lower holes 26', the lock cylinder 52 is oriented within recess 44 so that locking bolt 58 will project into passage 48 and into hole 26'. With most conventional key assemblies employing a lock cylinder, when unlocked, the lock cylinder is easily removed and reoriented as described above. Locking prevents removal of the lock cylinder 52 from the recess 44.

In use, the proper rod position is determined based upon the size of the trailer tongue, as described previously for the device of FIGS. 1 through 4. The key assembly 46 is then oriented so that the locking bolt 58 projects into the proper passage 48, 50. The device 10' is then positioned on the trailer tongue with the socket insert 18' positioned within the socket of the trailer tongue to be locked. The rod 30' is then inserted into the proper holes 26' or 28'. The hole 36' of rod 30' should be positioned so that when the rod 30' is fully inserted into the holes 26' or 28', the hole 36' will align with the appropriate passage 48 or 50. It may be necessary to rotate the rod 30' until the hole 36' aligns with the holes 26' or 28'.

Turning of the key 56 causes the locking bolt 58 to move between a projected position and a retracted position. When in the projected position, as shown in FIG. 5, the locking bolt 58 projects through the passage 48 or 50 and into the hole 30'. In this way the rod 30' is securely held within the holes 26' or 28' to prevent its removal and to prevent the device 10' from being removed from the trailer tongue. When in the retracted position, the end of locking bolt 58 should be clear of the holes 26', 28' so that the retaining rod 30' can be removed.

The locking device of the invention has the advantage that it can be used to accommodate trailer tongues of different sizes without necessitating the need for a different sized locking device. Depending upon the size of trailer desired to be locked, the retaining rod is merely inserted into the appropriate holes of the side members and locked in place.

The device employing the key assembly is easy to use and the solid block construction housing the key assembly prevents tampering with the device.

While the invention has been shown in only some of its forms, it should be apparent to those skilled in the art that it is not so limited but is susceptible to various changes without departing from the scope of the invention. For instance, while the retaining rod is positioned at only two different levels in the above description, several holes could be formed in the side members so that the retaining rod could be positioned at several different heights or levels.

I claim:

1. An anti-theft device that attaches to the trailer tongue of a trailer having a flange on a lower end which defines a width of the trailer tongue, and a socket for receiving a tow ball of a trailer hitch, and wherein the device can be used on different size trailer tongues having different widths, the device comprising:

a base;

a socket insert that projects from the base and is received within the socket of the trailer tongue;

a back plate extending upward from a rearward edge of the base;

a pair of side members that are joined to the back plate and oriented so that the trailer tongue must be passed between the side members for insertion and removal of the socket insert from the trailer tongue socket, each side member having at least one hole formed therein; wherein each side member has a lower end spaced above the base, defining a vertical space between each side member and the base for accommodating trailer tongues having different widths; and a retaining rod which inserts into the holes of the side members so that the retaining rod extends between the side members adjacent to the trailer tongue to prevent the passage of the trailer tongue between the side members and thus prevent removal of the socket insert from the trailer tongue socket.

2. The device of claim 1, wherein:

the side members are flat plates that are oriented generally perpendicular to the back plate of the base; and wherein the device further comprises:

an upper plate extending between upper ends of the side members above the base.

3. The device of claim 1, wherein:

the retaining rod has a stop portion at one end that prevents further insertion of the rod into the holes of the side members, and wherein the other end of the retaining rod has a hole which is adapted to receive a lock that is passed through the hole of the retaining rod and secured thereto.

4. The device of claim 1, wherein:

the base, socket insert and side members are integrally formed as one unitary piece.

5. An anti-theft device that attaches to the trailer tongue of a trailer having a socket for receiving a tow ball of a trailer hitch, and wherein the device can be used on different size trailer tongues, the device comprising:

a base;

a socket insert that projects from the base and is received within the socket of the trailer tongue;

a pair of side members that are joined to the base and oriented so that the trailer tongue must be passed between the side members for insertion and removal of the socket insert from the trailer tongue socket, each side member having first and second holes formed therein;

a retaining rod for inserting into either of the first and second holes of the side members so that the retaining rod extends between the side members adjacent to the trailer tongue to prevent the passage of the trailer tongue between the side members and thus prevent removal of the socket insert from the trailer tongue socket, and wherein the first and second holes are each located at different positions to accommodate trailer tongues of different sizes; and a locking bolt that is actuated between a projected and retracted position by a key assembly, the locking bolt and the key assembly being located in a recess in one of the side members adjacent to the holes in said one of the side members, the key assembly being orientable in a first position so that the locking bolt engages the retaining rod when the retaining rod is inserted into the first holes of the side members and the first locking bolt is actuated to the projected position, and the key assembly being orientable in a second position so that the locking bolt engages the retaining rod when the retaining rod is inserted into the second holes of the side members and the locking bolt is actuated to the projected position.

6. The device of claim 5, wherein:

the retaining rod has a stop portion at one end that prevents further insertion of the rod into the first and second holes of the side members, and wherein the other end of the retaining rod has a hole for receiving the locking bolt.

7. The device of claim 5, wherein:

the base, socket insert and side members are integrally formed as one unitary piece, and wherein a recess is formed in the unitary piece for housing the key assembly.

8. An anti-theft device that attaches to the trailer tongue of a trailer having a socket for receiving a tow ball of a trailer hitch, and wherein the device can be used on different size trailer tongues, the device comprising:

a base;

a socket insert that projects from the base and is received within the socket of the trailer tongue;

a pair of side members that are joined to the base and oriented so that the trailer tongue must be passed between the side members for insertion and removal of the socket insert from the trailer tongue socket, each side member having first and second holes formed therein;

a retaining rod for inserting into either of the first and second holes of the side members so that the retaining rod extends between the side members and above the trailer tongue to prevent the passage of the trailer tongue between the side members and thus prevent removal of the socket insert from the trailer tongue socket, and wherein the first and second holes are each located at different positions to accommodate trailer tongues of different sizes; and locking means for preventing removal of the retaining rod from said either of the first and second holes of the side members, the locking means including a locking bolt that is actuated between a projected and retracted position by a key assembly, the key assembly being orientable in a first position so that locking bolt engages the retaining rod when the retaining rod is inserted into the first holes of the side members and the locking bolt is actuated to the projected position, and the key assembly being orientable in a second position so that the locking bolt engages the retaining rod when the retaining rod is inserted into the second holes of the side members and the locking bolt is actuated to the projected position.

9. The device of claim 8, wherein:

the base includes a bottom plate from which the socket insert projects and an upstanding back plate that is oriented generally perpendicular to the bottom plate, and wherein the side members are joined to the back plate.

10. The device of claim 9, wherein:

the side members are flat plates that are oriented generally perpendicular to the bottom and back plates of the base.

11. The device of claim 8, wherein:

the retaining rod has a stop portion at one end that prevents further insertion of the rod into the first and second holes of the side members, and wherein the other end of the retaining rod has a hole for receiving the locking bolt.

12. The device of claim 8, wherein:

the base, socket insert and side members are integrally formed as one unitary piece.

13. The device of claim 8, wherein:

the base, socket insert and side members are integrally formed as one unitary piece, and wherein a recess is formed in the unitary piece for housing the key assembly.

* * * * *